United States Patent
Lee et al.

(10) Patent No.: US 12,358,488 B2
(45) Date of Patent: Jul. 15, 2025

(54) VEHICLE CONTROL DEVICE, VEHICLE CONTROL METHOD, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Nakho Lee, Seoul (KR); Sunghoon Woo, Seoul (KR); Seunghwan Choi, Seoul (KR); Jonghwan Lee, Seoul (KR); Sunho Lee, Seoul (KR); Keisuke Iwado, Ebina (JP); Hiroyuki Tokoi, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/838,914

(22) PCT Filed: Feb. 14, 2023

(86) PCT No.: PCT/JP2023/004957
§ 371 (c)(1),
(2) Date: Aug. 15, 2024

(87) PCT Pub. No.: WO2023/162778
PCT Pub. Date: Aug. 31, 2023

(65) Prior Publication Data
US 2025/0145140 A1      May 8, 2025

(30) Foreign Application Priority Data

Feb. 25, 2022   (JP) .................................. 2022-027787

(51) Int. Cl.
*B60W 10/06*      (2006.01)
*B60W 10/101*    (2012.01)

(52) U.S. Cl.
CPC .......... *B60W 10/101* (2013.01); *B60W 10/06* (2013.01); *B60W 2540/10* (2013.01)

(58) Field of Classification Search
CPC .. B60W 10/06; B60W 10/101; B60W 10/107; B60W 10/02; B60W 2540/10
See application file for complete search history.

(56) References Cited

U.S. PATENT DOCUMENTS

| 6,243,638 B1 * | 6/2001 | Abo .................. F16H 61/66254 474/18 |
| 2017/0030463 A1 * | 2/2017 | Takemori .......... F16H 61/66272 |

FOREIGN PATENT DOCUMENTS

| GB | 2152162 A | * 7/1985 | ............ B60W 10/04 |
| JP | H07-266932 A | 10/1995 | |

(Continued)

*Primary Examiner* — Edwin A Young
(74) *Attorney, Agent, or Firm* — Foley & Lardner LLP (57) ABSTRACT

A vehicle control device for controlling a vehicle that transmits a driving force input from an engine to a driving wheel via a continuously variable transmission mechanism, in which in a case where an accelerator is in a non-depressed state during traveling, a first traveling state is established in which fuel supply to an engine is stopped and a clutch between the engine and the driving wheel is disengaged, when the accelerator is depressed during traveling in the first traveling state, the engine is started and the clutch is engaged to increase a hydraulic pressure supplied to the pulleys, and a timing at which the hydraulic pressure supplied to the pulleys becomes higher due to the accelerator being depressed during traveling in the first traveling state is later than a timing at which the hydraulic pressure supplied to the pulleys becomes higher due to the accelerator being further depressed when the vehicle is not in the first traveling state.

7 Claims, 4 Drawing Sheets

(56) References Cited

FOREIGN PATENT DOCUMENTS

JP         3856309 B2 * 12/2006
JP    2020159424 A * 10/2020

* cited by examiner

VEHICLE CONTROL DEVICE, VEHICLE CONTROL METHOD, AND NON-TRANSITORY COMPUTER-READABLE MEDIUM

TECHNICAL FIELD

The present invention relates to a vehicle control device, a vehicle control method, and a program.

BACKGROUND ART

Patent Document 1 discloses an automatic starting and stopping device for an engine that performs control such that the engine is automatically stopped when a required torque becomes small with respect to a traveling resistance during operation of the engine, and a starting clutch is brought into a disengaged state when a prescribed requirement is satisfied after the engine is automatically stopped, and performs control such that when the engine is automatically stopped and the starting clutch is in the disengaged state, the engine is automatically started in a case where the required torque becomes large with respect to the traveling resistance, and the starting clutch is brought into a connected state in a case where a clutch engagement condition is satisfied during automatic starting of the engine.

PRIOR ART DOCUMENT

Patent Document

Patent Document 1: JPH07-266932A

SUMMARY OF INVENTION

However, in the automatic starting and stopping device of Patent Document 1, acceleration of a vehicle is delayed in response to an acceleration request of a driver, and the driver may be given a sense of discomfort.

The present invention has been made in view of the above problems, and an object thereof is to reduce a sense of discomfort given to a driver due to a deviation between an acceleration request of the driver and acceleration of a vehicle when a sailing-stop state (first traveling state) is released.

According to one aspect of the present invention, a vehicle control device for controlling a vehicle that transmits a driving force received from an engine to a driving wheel via a continuously variable transmission mechanism including a pair of pulleys and an endless member wound around the pulleys, and increases a hydraulic pressure supplied to the pulleys in a case where an accelerator is further depressed, wherein in a case where the accelerator is in a non-depressed state during traveling, a first traveling state is established in which fuel supply to the engine is stopped and a clutch between the engine and the driving wheel is disengaged, when the accelerator is depressed during traveling in the first traveling state, the engine is started and the clutch is engaged to increase the hydraulic pressure supplied to the pulleys, and a timing at which the hydraulic pressure supplied to the pulleys becomes higher due to the accelerator being depressed during traveling in the first traveling state is later than a timing at which the hydraulic pressure supplied to the pulleys becomes higher due to the accelerator being further depressed when the vehicle is not in the first traveling state.

According to other aspect of the present invention, a vehicle control device for controlling a vehicle that transmits a driving force received from an engine to a driving wheel via a continuously variable transmission mechanism including a pair of pulleys and an endless member wound around the pulleys, wherein in a case where an accelerator is in a non-depressed state during traveling, a second traveling state is established in which fuel supply to the engine is stopped and the engine is rotated by a driving force transmitted from the driving wheel to the engine, when the accelerator is depressed during traveling in the second traveling state, the fuel supply to the engine is restarted, and a hydraulic pressure supplied to the pulleys is increased, in a case where the accelerator is in a non-depressed state during traveling and a prescribed condition is satisfied, a first traveling state is established in which the fuel supply to the engine is stopped and a clutch between the engine and the driving wheel is disengaged, when the accelerator is depressed during traveling in the first traveling state, the engine is started and the clutch is engaged to increase the hydraulic pressure supplied to the pulleys, and a timing at which the hydraulic pressure supplied to the pulleys becomes higher due to the accelerator being depressed during traveling in the first traveling state is later than a timing at which the hydraulic pressure supplied to the pulleys becomes higher due to the accelerator being further depressed during traveling in the second traveling state.

According to the above aspects, it is possible to reduce a sense of discomfort given to a driver due to a deviation between an acceleration request of the driver and acceleration of a vehicle when a first traveling state is released.

DESCRIPTION OF EMBODIMENTS

Hereinafter, a transmission control device, a transmission control method, and a program according to an embodiment of the present invention (hereinafter referred to as the present embodiment) will be described with reference to the accompanying drawings. Hereinafter, a case where a speed ratio is large is referred to as Low, and a case where the speed ratio is small is referred to as High. Shifting the speed ratio to a Low side is referred to as downshift, and shifting the speed ratio to a High side is referred to as upshift.

Figure 1:
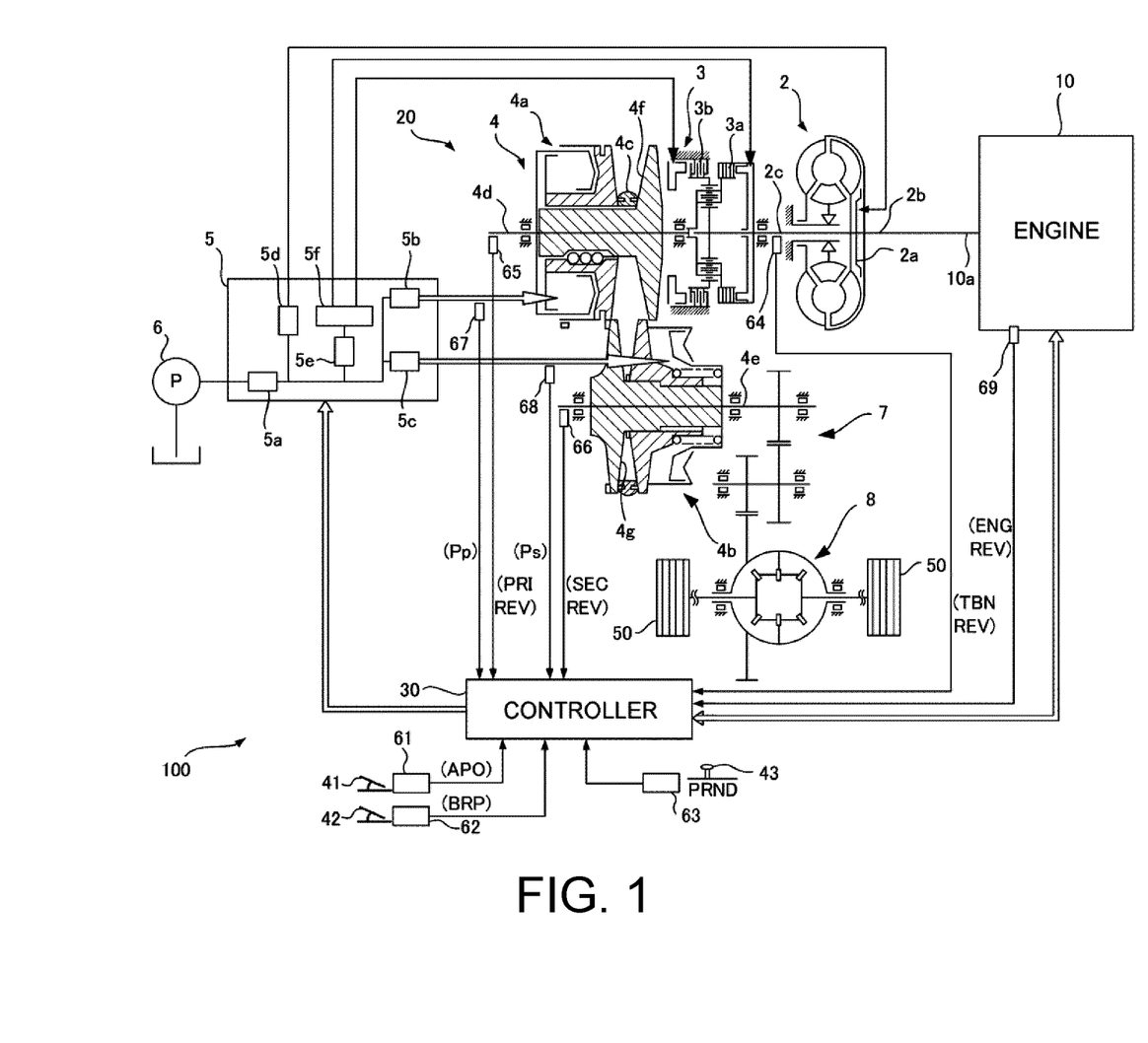
FIG. 1 is a schematic configuration diagram of a vehicle including a vehicle control device according to an embodiment of the present invention.
Figure 2:
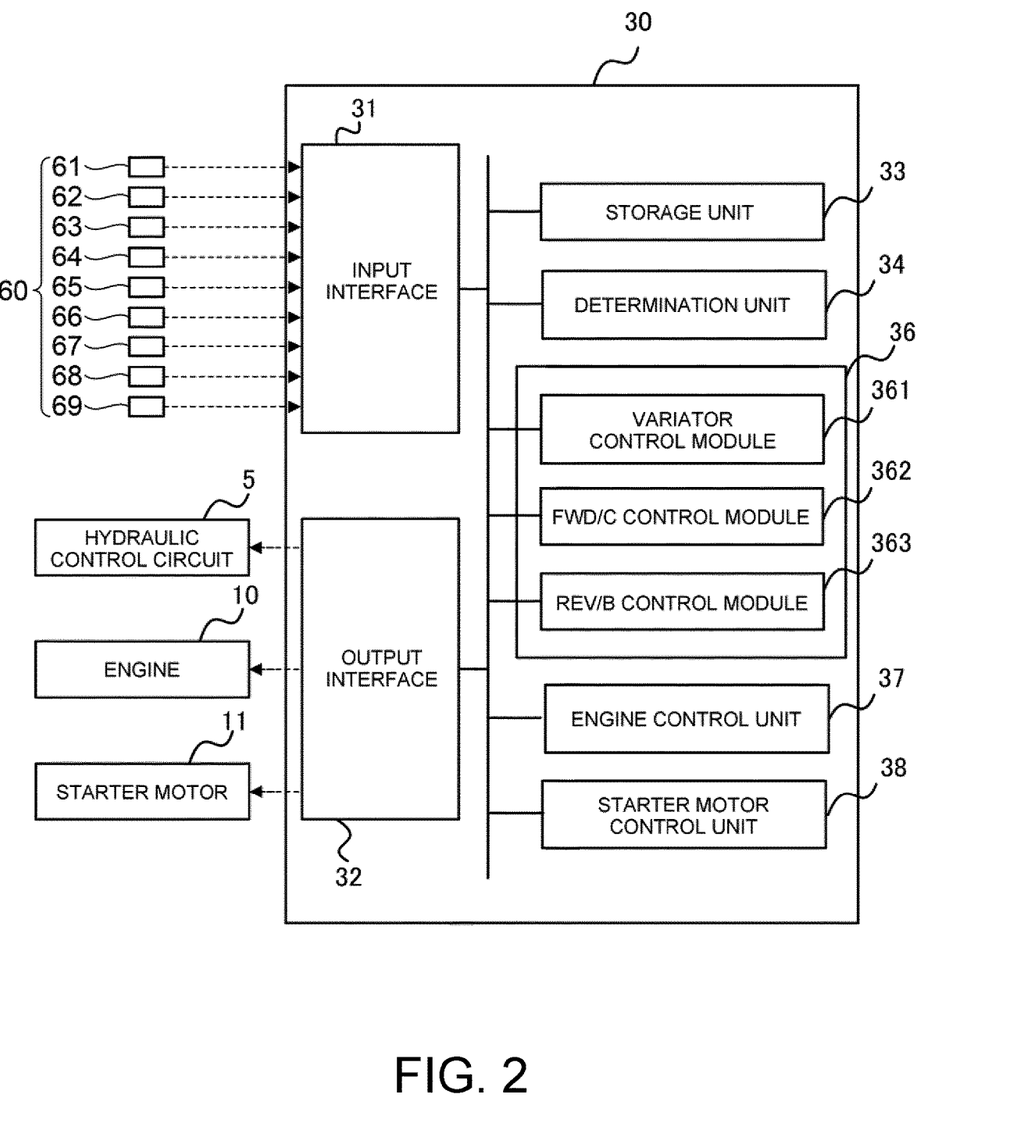
FIG. 2 is a configuration block diagram illustrating a controller and main configurations connected to the controller.

First, a vehicle 100 to which an automatic transmission 20 as a transmission according to the present embodiment is applied will be described with reference to FIGS. 1 and 2. FIG. 1 is a schematic configuration diagram of the vehicle 100 including a controller 30 as a control device of the vehicle 100 according to the embodiment of the present invention. FIG. 2 is a configuration block diagram illustrating the controller 30 and main configurations connected to the controller 30.

As illustrated in FIG. 1, the vehicle 100 includes an engine 10 as a drive source, the automatic transmission 20, a torque converter 2 provided between the engine 10 and the automatic transmission 20, and the controller 30.

The torque converter 2 is provided with a lock-up clutch 2a. The lock-up clutch 2a is engaged when the vehicle 100 travels at a prescribed lock-up vehicle speed or higher. In a case where the lock-up clutch 2a is engaged, an input shaft 2b as an input element and an output shaft 2c as an output element of the torque converter 2 are directly connected, and the input shaft 2b and the output shaft 2c rotate at the same speed. Thus, the rotation of the output shaft 10a of the engine 10 is transmitted as it is from the output shaft 2c of the torque converter 2 to the automatic transmission 20 in a state where the lock-up clutch 2a is engaged.

The automatic transmission 20 includes a forward/reverse switching mechanism 3 as a power transmission mechanism, a variator 4 as a continuously variable transmission mechanism, a hydraulic control circuit 5, and an oil pump 6.

In the vehicle 100, rotation generated in the engine 10 is transmitted to a driving wheel 50 via the torque converter 2, the forward/reverse switching mechanism 3, the variator 4, a gear set 7, and a differential gear device 8.

The forward/reverse switching mechanism 3 includes a double pinion planetary gear set as a main component, a sun gear of the double pinion planetary gear set is coupled to the engine 10 via the torque converter 2, and a carrier of the double pinion planetary gear set is coupled to an input shaft 4d (primary pulley 4a) of the variator 4. The forward/reverse switching mechanism 3 further includes a forward clutch (FWD/C) 3a as a clutch that directly connects the sun gear and the carrier of the double pinion planetary gear set, and a reverse brake (REV/B) 3b that fixes a ring gear. When the forward clutch 3a is engaged, input rotation from the engine 10 via the torque converter 2 is transmitted to the primary pulley 4a as it is, and when the reverse brake 3b is engaged, the input rotation from the engine 10 via the torque converter 2 is reversed, decelerated, and transmitted to the primary pulley 4a.

The variator 4 is a continuously variable transmission mechanism that shifts the rotation of the engine 10 transmitted to the input shaft 4d and transmits the shifted rotation from an output shaft 4e to the driving wheel 50. The variator 4 includes the primary pulley 4a provided on an engine 10 side in a power transmission path, a secondary pulley 4b provided on a driving wheel 50 side in the power transmission path, and a belt 4c as an endless member that is wound around the primary pulley 4a and the secondary pulley 4b. In the vehicle 100, a driving force received from the engine 10 is transmitted to the driving wheel 50 via the variator 4 including the pair of pulleys 4a and 4b and the belt 4c wound around the pulleys 4a and 4b.

In the variator 4, a hydraulic pressure supplied to the primary pulley 4a and a hydraulic pressure supplied to the secondary pulley 4b are controlled, so that a contact radius between the belt 4c and each of the pulleys 4a and 4b is changed, and the speed ratio is changed. In the variator 4, the hydraulic pressures supplied to the pulleys 4a and 4b are increased in a case where an accelerator pedal 41 to be described later is further depressed.

The oil pump 6 is a mechanical oil pump that receives the rotation of the engine 10 and is driven using a part of power of the engine 10. Oil discharged from the oil pump 6 is supplied to the hydraulic control circuit 5.

The hydraulic control circuit 5 includes a regulator valve 5a that regulates a pressure of a hydraulic oil supplied from the oil pump 6 to generate a required hydraulic pressure, a primary solenoid valve 5b that adjusts the hydraulic pressure supplied to the primary pulley 4a, a secondary solenoid valve 5c that adjusts the hydraulic pressure supplied to the secondary pulley 4b, a lock-up solenoid valve 5d that adjusts a hydraulic pressure supplied to the lock-up clutch 2a, a select solenoid valve 5e that adjusts a hydraulic pressure supplied to the forward clutch 3a and a hydraulic pressure supplied to the reverse brake 3b, a manual valve 5f that switches supply paths of the hydraulic pressures to the forward clutch 3a and the reverse brake 3b, and the like.

The hydraulic control circuit 5 supplies the adjusted hydraulic pressure to each portion of the torque converter 2, the forward/reverse switching mechanism 3, and the variator 4 based on a control signal from the controller 30.

The controller 30 is implemented by a microcomputer including a central processing unit (CPU), a read-only memory (ROM), a random access memory (RAM), and input/output interfaces (I/O interfaces) 31 and 32 (see FIG. 2). The controller 30 performs various processes by reading and executing programs stored in the ROM by the CPU. The controller 30 may also be implemented by a plurality of microcomputers. Specifically, the controller 30 may include an automatic transmission control unit (ATCU) that controls the automatic transmission 20, a shift control unit (SCU) that controls a shift range, an engine control unit (ECU) that controls the engine 10, and the like. The controller 30 controls the hydraulic control circuit 5, the engine 10, and a starter motor 11 (see FIG. 2) based on signals output from various sensors 60 and the like.

The controller 30 controls a rotation speed ENGREV of the engine 10 (hereinafter, also referred to as an engine rotation speed ENGREV), an engine torque, an engagement state of the lock-up clutch 2a, a speed ratio of the variator 4, engagement states of the forward clutch 3a and the reverse brake 3b, and the like based on the signals from the various sensors 60 that detect a state of each portion of the vehicle 100.

The controller 30 receives signals such as a signal from an accelerator opening sensor 61 that detects an accelerator pedal opening APO corresponding to an operation amount of the accelerator pedal 41, a signal from a brake fluid pressure sensor 62 that detects a brake fluid pressure BRP corresponding to an operation amount of a brake pedal 42, a signal from an inhibitor switch 63 that detects a position of a shifter 43, a signal from a turbine rotation speed sensor 64 that detects a rotation speed TBNREV of the output shaft 2c of the torque converter 2, a signal from a primary rotation speed sensor 65 that detects a rotation speed PRIREV of the input shaft 4d (primary pulley 4a) of the variator 4, a signal from a secondary rotation speed sensor 66 that detects a rotation speed SECREV of the output shaft 4e (secondary pulley 4b) of the variator 4, a signal from a primary hydraulic pressure sensor 67 that detects a primary hydraulic pressure Pp supplied to the primary pulley 4a, a signal from a secondary hydraulic pressure sensor 68 that detects a secondary hydraulic pressure Ps supplied to the secondary pulley 4b, and a signal from an engine rotation speed sensor 69 that detects an engine rotation speed ENGREV.

In the present embodiment, the controller 30 may execute idling-stop control in which the engine 10 is automatically stopped when a prescribed condition is satisfied while the vehicle 100 is stopped, coast-stop control in which the fuel supply to the engine 10 is stopped and the forward clutch 3a between the engine 10 and the driving wheel 50 is disengaged when there is a high possibility of shifting to the idling-stop control in a case where the vehicle 100 is coasting and the vehicle 100 is stopped as it is, and sailing-stop control in which the fuel supply to the engine 10 is stopped during traveling of the vehicle 100 and the forward clutch 3a between the engine 10 and the driving wheel 50 is released.

The controller 30 executes the coast-stop control (coast-stop state) in which the engine 10 is stopped in a case where a prescribed condition (prescribed condition: when the lock-up clutch 2a is in the disengaged state, the accelerator pedal 41 is in a non-depressed state, the brake pedal 42 is in a depressed state, and the vehicle speed is lower than a prescribed speed) is satisfied during coasting, and shifts from the coast-stop control to the idling-stop control (idling-stop state) in a case where the prescribed condition is satisfied after the vehicle 100 is stopped. In addition, in a case where the accelerator pedal 41 is in the non-depressed state during traveling and a prescribed condition (prescribed condition: when the lock-up clutch 2a is in an engaged state, the brake pedal 42 is in a depressed state, and the vehicle speed is lower than a prescribed speed (higher than a coast-stop vehicle speed)) is satisfied, the controller 30 executes the sailing-stop control in which the fuel supply to the engine 10 is stopped and the forward clutch 3a between the engine 10 and the driving wheel 50 is disengaged (sailing-stop state: first traveling state).

As illustrated in FIG. 2, the controller 30 includes the input interface 31, the output interface 32, a storage unit 33, a determination unit 34, and a hydraulic control circuit control unit (hereinafter, simply referred to as a "circuit control unit") 36, an engine control unit 37, and a starter motor control unit 38, which are electrically connected to one another. The storage unit 33, the determination unit 34, the circuit control unit 36, the engine control unit 37, and the starter motor control unit 38 are virtual units having functions of the controller 30 for controlling the vehicle 100, and do not mean physical existences.

The input interface 31 receives output signals from the various sensors 60.

The storage unit 33 is a memory for temporarily storing the output signals from the various sensors 60. The storage unit 33 stores processing programs and algorithm programs to be executed by the circuit control unit 36, the engine control unit 37, and the starter motor control unit 38. In the present embodiment, the storage unit 33 is incorporated in the controller 30, but is not limited thereto, and may be provided separately from the controller 30, for example.

The determination unit 34 performs various determinations based on the output signals output from the various sensors 60, and outputs various determination results to the circuit control unit 36, the engine control unit 37, or the starter motor control unit 38.

The circuit control unit 36 generates a circuit control command based on the output signals output from the various sensors 60, and outputs the generated circuit control command to the hydraulic control circuit 5 via the output interface 32. The circuit control unit 36 includes a variator control module 361, a forward clutch control module 362, and a reverse brake control module 363.

The variator control module 361 generates a variator control command based on the output signals output from the various sensors 60, and outputs the generated variator control command to the hydraulic control circuit 5 via the output interface 32. Oil is supplied from the hydraulic control circuit 5, the contact radius between the belt 4c and each of the pulleys 4a and 4b is changed, and the speed ratio is changed.

The forward clutch control module 362 generates a clutch control command based on the output signals output from the various sensors 60, and outputs the generated clutch control command to the hydraulic control circuit 5 via the output interface 32. Oil is supplied from the hydraulic control circuit 5, and the forward clutch 3a is switched between engagement and disengagement.

The reverse brake control module 363 generates a brake control command based on the output signals output from the various sensors 60, and outputs the generated brake control command to the hydraulic control circuit 5 via the output interface 32. Oil is supplied from the hydraulic control circuit 5, the reverse brake 3b is switched between engagement and disengagement.

The engine control unit 37 generates an engine control command based on the output signals output from the various sensors 60, and outputs the generated engine control command to the engine 10 via the output interface 32.

The starter motor control unit 38 generates a starter motor control command based on the output signals output from the various sensors 60, and outputs the generated starter motor control command to the starter motor 11 via the output interface 32.

Figure 3:
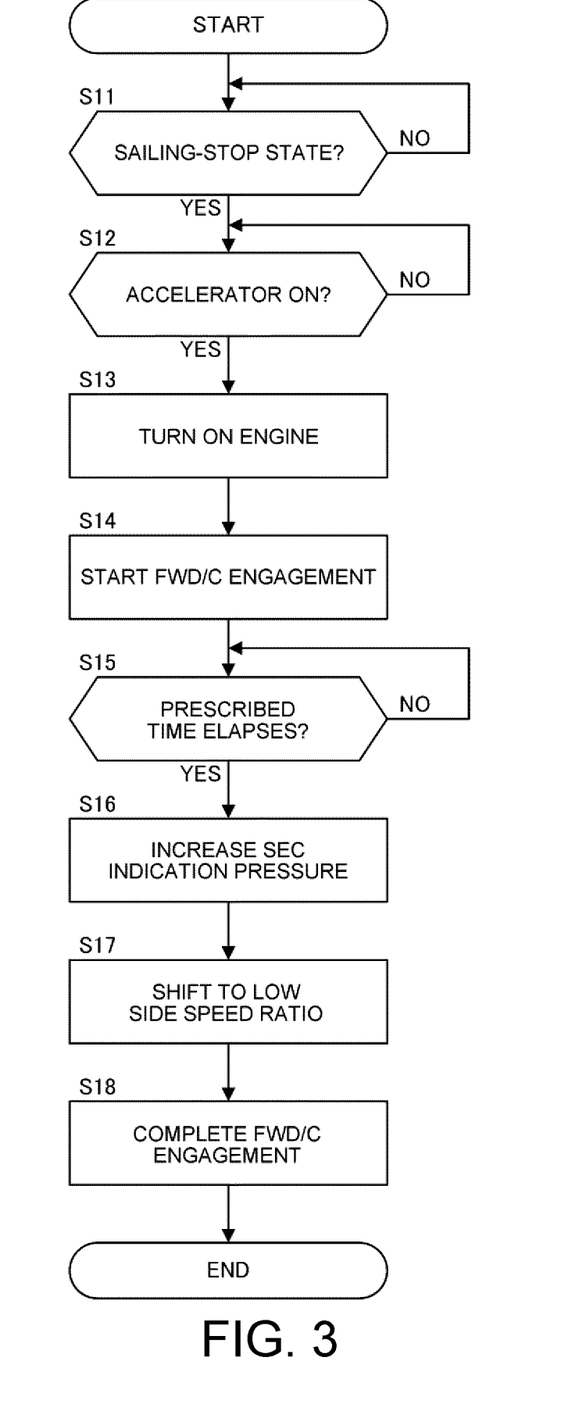
FIG. 3 is a flowchart illustrating a process of releasing a first traveling state performed by a control device.

Next, a process of releasing the sailing-stop state to be performed by the controller 30 will be described with reference to FIG. 3. FIG. 3 is a flowchart illustrating the process of releasing the sailing-stop state to be performed by the controller 30. The process of releasing the sailing-stop state is repeatedly executed by the controller 30 at regular time intervals.

As described above, in the variator 4, the hydraulic pressures supplied to the pulleys 4a and 4b are increased in a case where the accelerator pedal 41 to be described later is further depressed. When the hydraulic pressure increases, an oil leakage amount from gaps among the components increases. Therefore, the amount of oil in the circuit decreases, a timing of shifting to the Low side of the variator 4 and a timing of engaging the forward clutch 3a are delayed, and a driver may be given a sense of discomfort due to a deviation between an acceleration request of the driver and acceleration of the vehicle 100. Therefore, in the vehicle 100, the process of releasing the sailing-stop state illustrated in FIG. 3 is executed.

In step S11, the controller 30 determines whether the vehicle 100 is traveling in the sailing-stop state. When it is determined in step S11 that the vehicle 100 is traveling in the sailing-stop state, the process proceeds to step S12. On the other hand, when it is determined in step S11 that the vehicle 100 is not traveling in the sailing-stop state, the process of step S11 is repeated.

In step S12, the controller 30 determines whether the accelerator pedal 41 is operated by the driver and the accelerator is turned on. Specifically, the controller 30 detects an accelerator pedal opening APO based on a signal received from the accelerator opening sensor 61, and determines whether the accelerator pedal 41 is operated. When it is determined in step S12 that the accelerator is turned on, the process proceeds to step S13. On the other hand, when it is determined in step S12 that the accelerator is not turned on, that is, the accelerator pedal 41 is not operated and the accelerator remains off, the process of step S12 is repeated.

That is, this flow is started when the accelerator pedal 41 is operated by the driver and the accelerator is turned on (determined to be "Yes" in step S12) in a case where the vehicle 100 is traveling in the sailing-stop state (determined to be "Yes" in step S11).

In step S13, the controller 30 rotationally drives the starter motor 11 to turn on the engine 10.

In step S14, the controller 30 starts engagement of the forward clutch 3a. Specifically, the controller 30 transmits an electrical signal to the hydraulic control circuit 5 to supply oil to a pressure chamber of the forward clutch 3a.

The processes of step S13 and step S14 may be executed simultaneously, or may be executed in reverse order.

In step S15, it is determined whether a prescribed time elapses. When it is determined in step S15 that the prescribed time elapses, the process proceeds to step S16. On the other hand, when it is determined in step S15 that the prescribed time does not elapse, the process of step S15 is repeated. The prescribed time is set to be longer than a time required for the pre-charge so that the process proceeds to step S16 after pre-charge for filling the hydraulic chamber with the oil for engaging the forward clutch 3a. The pre-charge is a control in which an indication pressure is increased stepwise to a pre-charge pressure for a prescribed time at the start of engagement control of the clutch, and then is decreased to a prescribed pressure.

In this manner, a timing at which the hydraulic pressures supplied to the pulleys 4a and 4b become higher due to the accelerator pedal 41 being depressed in the sailing-stop state is after the prescribed time elapses from the start of the supply of the oil for engaging the forward clutch 3a. Specifically, the timing at which the hydraulic pressures supplied to the pulleys 4a and 4b become higher due to the accelerator pedal 41 being depressed in the sailing-stop state is after the pre-charge of filling the hydraulic chamber with the oil for engaging the forward clutch 3a.

In step S16, the controller 30 transmits an electrical signal to the hydraulic control circuit 5 to increase the indication pressure of the oil supplied to the secondary pulley 4b. The controller 30 transmits an electrical signal to the hydraulic control circuit 5 to simultaneously increase the indication pressure of the oil supplied to the primary pulley 4a.

Here, since a torque to be transmitted is small in a state where the accelerator pedal 41 is not operated, the pressures of the oil supplied to the pulleys 4a and 4b are reduced. In contrast, in step S16, the pressure of the oil supplied to the pulleys 4a and 4b is increased in advance before the accelerator pedal 41 is operated to increase the torque to be transmitted.

In step S17, the controller 30 downshifts the speed ratio of the variator 4 to the speed ratio on the Low side. By downshifting the speed ratio of the variator 4 to the speed ratio on the Low side before the engagement of the forward clutch 3a is completed, the vehicle 100 can be quickly accelerated after the forward clutch 3a is brought into the engaged state.

In step S18, the controller 30 completes the engagement of the forward clutch 3a. Accordingly, the forward clutch 3a has a transmission torque capacity.

Figure 4:
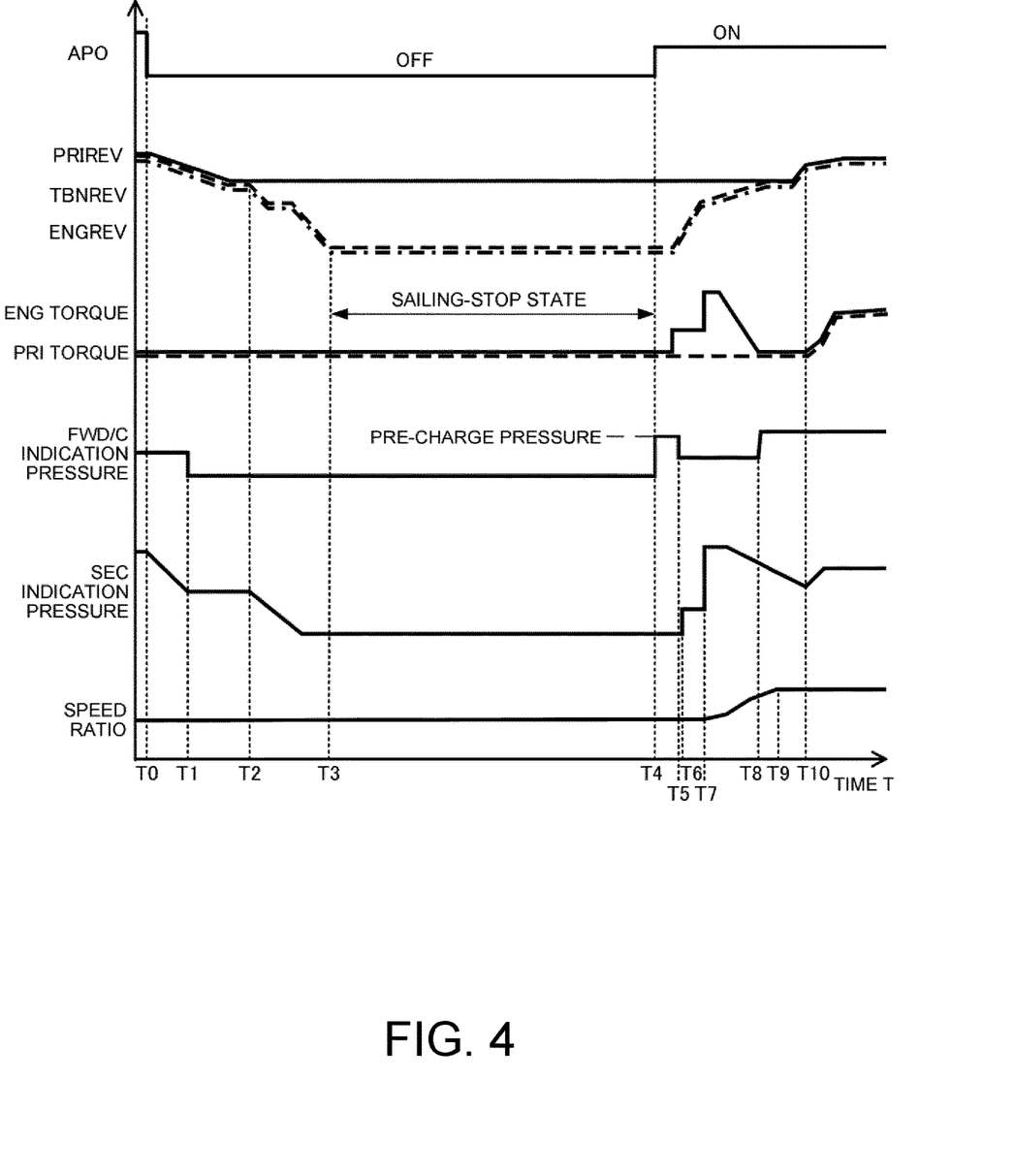
FIG. 4 is a timing chart of an example of the process of releasing the first traveling state performed by the control device.

Next, the process of releasing the sailing-stop state to be performed by the controller 30 will be specifically described with reference to FIG. 4. FIG. 4 is a timing chart illustrating an example of the process of releasing the sailing-stop state to be performed by the controller 30.

In FIG. 4, a horizontal axis represents time T [sec], and a vertical axis represents the accelerator pedal opening APO, a primary pulley rotation speed (PRIREV: solid line) [rpm], a turbine rotation speed (TBNREV: broken line) [rpm], the engine rotation speed (ENGREV: one-dot chain line) [rpm], the engine torque (ENG torque: solid line) [N·m], a primary pulley torque (PRI torque: broken line) [N·m], an indication pressure (FWD/C indication pressure) of the forward clutch 3a, an indication pressure (SEC indication pressure) of the secondary pulley 4b, and the speed ratio of the variator 4.

In the example illustrated in FIG. 4, at a time T0, the operation of the accelerator pedal 41 by the driver is stopped, and the accelerator is turned off. Accordingly, the primary pulley rotation speed PRIREV, the turbine rotation speed TBNREV, and the engine rotation speed ENGREV start to decrease. Further, the secondary pulley indication pressure also starts to decrease as the torque to be transmitted decreases. In addition, at the time T0, the supply of fuel to the engine 10 is stopped (fuel cut state).

At a time T1, the indication pressure of the forward clutch 3a becomes zero. Accordingly, the forward clutch 3a is gradually disengaged from the engaged state. That is, the transmission torque capacity of the forward clutch 3a gradually decreases.

At a time T2, the forward clutch 3a is in the disengaged state, and the transmission torque capacity of the forward clutch 3a becomes zero. At this time, the vehicle 100 continues coasting and the primary pulley rotation speed PRIREV is maintained. On the other hand, since the forward clutch 3a is in the disengaged state, the turbine rotation speed TBNREV and the engine rotation speed ENGREV both start to decrease.

At a time T3, the engine 10 is stopped because the supply of fuel is stopped, the forward clutch 3a is in the disengaged state, and the rotation of the driving wheel 50 is not transmitted. That is, both the turbine rotation speed TBNREV and the engine rotation speed ENGREV become zero. Accordingly, the vehicle 100 is in the sailing-stop state.

At a time T4, the accelerator pedal 41 is operated by the driver, and the accelerator is turned on. Accordingly, the process of releasing the sailing-stop state is started. That is, when the accelerator pedal 41 is depressed in the sailing-stop state, the fuel supply to the engine 10 is restarted to start the engine 10, and the forward clutch 3a is engaged to increase the hydraulic pressures supplied to the pulleys 4a and 4b.

Between the time T4 and a time T5, the pre-charge is performed, and the supply of oil to the hydraulic chamber of the forward clutch 3a is started. That is, the pre-charge is performed in which a magnitude of an engaging hydraulic pressure to be supplied to the forward clutch 3a increases from a disengaging hydraulic pressure to a state before the forward clutch 3a starts engaging.

At the time T5, the pre-charge ends, and the indication pressure decreases. Between the time T5 and a time T8, the oil is supplied to the hydraulic chamber of the forward clutch 3a at an indication pressure lower than that in the pre-charge. At the time T8, the forward clutch 3a abuts by the oil supplied to the hydraulic chamber. That is, at a time point before the time T8 is reached, an input-side friction transmission member and an output-side friction transmission member of the forward clutch 3a are not in contact with each other, and the forward clutch 3a is in a state where the transmission torque capacity is not yet present, and at the time T8, the input-side friction transmission member and the output-side friction transmission member of the forward clutch 3a come into contact with each other. In this manner, the control until the forward clutch 3a shifts from a fully opened state to an abutting state is also referred to as backlash elimination control, and the pre-charge is a part of the backlash elimination control. Immediately after the friction transmission members shift from the non-contact state to the contact state (at a time point when backlash elimination control is completed), that is, at a moment when the friction transmission members abut, the forward clutch 3a is in a state where the transmission torque capacity is not present. When the hydraulic pressure is further supplied to the hydraulic chamber from this state, the transmission torque capacity increases.

Between the time T8 and a time T10, the pressure of the oil supplied to the hydraulic chamber of the forward clutch 3a increases to the engaging hydraulic pressure. That is, the transmission torque capacity of the forward clutch 3a gradually increases from the state of zero.

On the other hand, at a time T6 after the elapse of the prescribed time from the time T4, the secondary pulley indication pressure increases. Accordingly, the hydraulic pressure supplied to the secondary pulley 4b increases. The timing at which the hydraulic pressures supplied to the pulleys 4a and 4b become higher due to the accelerator pedal 41 being depressed in the sailing-stop state is later than the timing at which the hydraulic pressures supplied to the pulleys 4a and 4b become higher due to the accelerator pedal 41 being further depressed when the vehicle is not in the sailing-stop state.

In this manner, the timing at which the hydraulic pressures supplied to the pulleys 4a and 4b become higher due to the accelerator pedal 41 being depressed in the sailing-stop state is later than the timing at which the hydraulic pressures supplied to the pulleys 4a and 4b become higher due to the accelerator pedal 41 being further depressed when the vehicle is not in the sailing-stop state, and therefore, at the time of re-acceleration from the sailing-stop state, it is possible to reduce the oil leakage amount due to an increase in hydraulic pressure, and the amount of oil in the circuit increases. Accordingly, it is possible to advance the timing of shifting to the Low side and engaging the forward clutch 3a. Therefore, it is possible to quickly accelerate the vehicle 100 in response to the acceleration request, and thus it is possible to reduce the sense of discomfort given to the driver due to the deviation between the acceleration request of the driver and the acceleration of the vehicle 100.

In addition, in a case where the accelerator pedal 41 is in the non-depressed state during traveling, the vehicle 100 is brought into a coasting state (second traveling state) in which the fuel supply to the engine 10 is stopped and the engine 10 is rotated by the driving force transmitted from the driving wheel 50 to the engine 10. When the accelerator pedal 41 is depressed in the coasting state, the fuel supply to the engine 10 is restarted, and the hydraulic pressures supplied to the pulleys 4a and 4b are increased (immediately after the accelerator pedal 41 is depressed). At this time, the timing at which the hydraulic pressures supplied to the pulleys 4a and 4b become higher due to the accelerator pedal 41 being depressed in the sailing-stop state is later than a timing at which the hydraulic pressures supplied to the pulleys 4a and 4b become higher due to the accelerator pedal 41 being further depressed in the coasting state. For example, when the accelerator pedal 41 is depressed in the coasting state, the hydraulic pressures supplied to the pulleys 4a and 4b are increased immediately after the accelerator pedal 41 is depressed in order to respond to the acceleration request of the driver. On the other hand, the timing at which the hydraulic pressures supplied to the pulleys 4a and 4b become higher due to the accelerator pedal 41 being depressed in the sailing-stop state is later than the timing at which the hydraulic pressures supplied to the pulleys 4a and 4b become higher in the coasting state because the hydraulic pressures are increased after the pre-charge pressure supplied to the forward clutch 3a decreases after the depression of the accelerator pedal 41 is detected.

In this manner, the timing at which the hydraulic pressures supplied to the pulleys 4a and 4b become higher due to the accelerator pedal 41 being depressed in the sailing-stop state is later than the timing at which the hydraulic pressures supplied to the pulleys 4a and 4b become higher due to the accelerator pedal 41 being further depressed in the coasting state, and therefore, at the time of re-acceleration from the sailing-stop state, it is possible to reduce the oil leakage amount due to the increase in hydraulic pressure, and the amount of oil in the circuit increases. Accordingly, it is possible to advance the timing of shifting to the Low side and engaging the forward clutch 3a. Therefore, it is possible to quickly accelerate the vehicle 100 in response to the acceleration request, and thus it is possible to reduce the sense of discomfort given to the driver due to the deviation between the acceleration request of the driver and the acceleration of the vehicle 100.

Since the hydraulic pressures supplied to the pulleys 4a and 4b increase after the pre-charge, it is possible to perform the pre-charge in which a large amount of oil is required while the oil leakage amount due to the increase in the hydraulic pressure is small. Accordingly, the timing of engaging the forward clutch 3a can be advanced. Therefore, it is possible to quickly accelerate the vehicle 100 in response to the acceleration request, and thus it is possible to reduce the sense of discomfort given to the driver due to the deviation between the acceleration request of the driver and the acceleration of the vehicle 100.

Between a time T7 and a time T9, the downshift is performed to increase the speed ratio of the variator 4. That is, when the accelerator pedal 41 is depressed in the sailing-stop state, the forward clutch 3a is engaged after performing the downshift for increasing the speed ratio.

In this manner, since the forward clutch 3a is engaged after performing the downshift, the amount of oil that can be used for the shift increases, and the speed reduction ratio can be quickly increased. In addition, since the forward clutch 3a is not engaged at the time of shifting, the speed of shifting is increased, the acceleration of the vehicle 100 after the engagement of the forward clutch 3a can be improved, and the sense of discomfort given to the driver at the time of re-acceleration can be reduced.

At the time 10, the forward clutch 3a is in the engaged state (completely engaged state). Therefore, the engine torque and the primary pulley torque increase in conjunction with each other. Accordingly, the process of releasing the sailing-stop state to be performed by the controller 30 is completed.

The configurations and effects of the present embodiment described above will be collectively described.

(1) (6) (8) In a vehicle control device (controller 30) for controlling the vehicle 100 that transmits a driving force received from the engine 10 to the driving wheel 50 via the variator 4 including the pair of pulleys 4a and 4b and the belt 4c wound around the pulleys 4a and 4b to increase a hydraulic pressure supplied to the pulleys 4a and 4b in a case where the accelerator pedal 41 is further depressed, in a case where the accelerator pedal 41 is in a non-depressed state during traveling, a sailing-stop state (first traveling state) is established in which fuel supply to the engine 10 is stopped and the forward clutch 3a between the engine 10 and the driving wheel 50 is disengaged, when the accelerator pedal 41 is depressed during traveling in the sailing-stop state, the forward clutch 3a is engaged together with start of the engine 10 to increase the hydraulic pressure supplied to the pulleys 4a and 4b, and a timing at which the hydraulic pressure supplied to the pulleys 4a and 4b becomes higher due to the accelerator pedal 41 being depressed during traveling in the sailing-stop state is later than a timing at which the hydraulic pressure supplied to the pulleys 4a and 4b becomes higher due to the accelerator pedal 41 being further depressed when the vehicle is not in the sailing-stop state.

According to this configuration, the timing at which the hydraulic pressure supplied to the pulleys 4a and 4b becomes higher due to the accelerator pedal 41 being depressed in the sailing-stop state is later than the timing at which the hydraulic pressure supplied to the pulleys 4a and 4b becomes higher due to the accelerator pedal 41 being further depressed when the vehicle is not in the sailing-stop state, and therefore, at the time of re-acceleration from the sailing-stop state, it is possible to reduce the oil leakage amount due to an increase in hydraulic pressure, and the amount of oil in the circuit increases. Accordingly, it is possible to advance the timing of shifting to the Low side and engaging the forward clutch 3a. Therefore, it is possible to quickly accelerate the vehicle 100 in response to the acceleration request, and thus it is possible to reduce the sense of discomfort given to the driver due to the deviation between the acceleration request of the driver and the acceleration of the vehicle 100.

(2) In the vehicle control device (controller 30), when the accelerator pedal 41 is depressed during traveling in the sailing-stop state, the forward clutch 3a is engaged after performing a downshift for increasing a speed ratio (speed reduction ratio).

According to this configuration, the forward clutch 3a is engaged after performing the downshift, and therefore, the amount of oil that can be used for shift is increased, and the speed reduction ratio can be quickly increased. In addition, since the forward clutch 3a is not engaged at the time of shifting, the speed of shifting is increased, the acceleration of the vehicle 100 after the engagement of the forward clutch 3a can be improved, and the sense of discomfort given to the driver at the time of re-acceleration can be reduced.

(3) (4) In the vehicle control device (controller 30), the timing at which the hydraulic pressure supplied to the pulleys 4a and 4b becomes higher due to the accelerator pedal 41 being depressed during traveling in the sailing-stop state is after a prescribed time elapses from start of supply of an oil for engaging the forward clutch 3a. Specifically, in the vehicle control device (controller 30), the timing at which the hydraulic pressure supplied to the pulleys 4a and 4b becomes higher due to the accelerator pedal 41 being depressed during traveling in the sailing-stop state is after pre-charging of filling a hydraulic chamber with the oil for engaging the forward clutch 3a.

According to this configuration, since the hydraulic pressure supplied to the pulleys 4a and 4b increases after the pre-charge, it is possible to perform the pre-charge in which a large amount of oil is required while the oil leakage amount due to the increase in the hydraulic pressure is small. Accordingly, the timing of engaging the forward clutch 3a can be advanced. Therefore, it is possible to quickly accelerate the vehicle 100 in response to the acceleration request, and thus it is possible to reduce the sense of discomfort given to the driver due to the deviation between the acceleration request of the driver and the acceleration of the vehicle 100.

(5) (7) (9) In a vehicle control device (controller 30) for controlling the vehicle 100 that transmits a driving force received from the engine 10 to the driving wheel 50 via the variator 4 including the pair of pulleys 4a and 4b and the belt 4c wound around the pulleys 4a and 4b, in a case where the accelerator pedal 41 is in a non-depressed state during traveling, a coasting state (second traveling state) is established in which the fuel supply to the engine 10 is stopped and the engine 10 is rotated by a driving force transmitted from the driving wheel 50 to the engine 10, when the accelerator pedal 41 is depressed during traveling in the coasting state, the fuel supply to the engine 10 is restarted, and the hydraulic pressure supplied to the pulleys 4a and 4b is increased, in a case where the accelerator pedal 41 is in a non-depressed state during traveling and a prescribed condition is satisfied, a sailing-stop state (first traveling state) is established in which the fuel supply to the engine 10 is stopped and the forward clutch 3a between the engine 10 and the driving wheel 50 is disengaged, when the accelerator pedal 41 is depressed during traveling in the sailing-stop state, the engine 10 is started and the forward clutch 3a is engaged to increase the hydraulic pressure supplied to the pulleys 4a and 4b, and a timing at which the hydraulic pressure supplied to the pulleys 4a and 4b increases due to the accelerator pedal 41 being depressed during traveling in the sailing-stop state is later than a timing at which the hydraulic pressure supplied to the pulleys 4a and 4b increases due to the accelerator pedal 41 being further depressed in the coasting state.

According to this configuration, the timing at which the hydraulic pressure supplied to the pulleys 4a and 4b becomes higher due to the accelerator pedal 41 being depressed in the sailing-stop state is later than the timing at which the hydraulic pressure supplied to the pulleys 4a and 4b becomes higher due to the accelerator pedal 41 being further depressed in the coasting state, and therefore, at the time of re-acceleration from the sailing-stop state, it is possible to reduce the oil leakage amount due to the increase in hydraulic pressure, and the amount of oil in the circuit increases. Accordingly, it is possible to advance the timing of shifting to the Low side and engaging the forward clutch 3a. Therefore, it is possible to quickly accelerate the vehicle 100 in response to the acceleration request, and thus it is possible to reduce the sense of discomfort given to the driver due to the deviation between the acceleration request of the driver and the acceleration of the vehicle 100.

While an embodiment of the invention has been described, the embodiment is merely one of application examples of the invention, and does not intend to limit a technical scope of the invention to a specific configuration according to the embodiment.

A series of processes in the automatic transmission 20 described above may be provided as a program for causing a computer to execute the processes.

That is, in a program according to the present embodiment, in a case where the accelerator pedal 41 is in a non-depressed state during traveling, a sailing-stop state (first traveling state) is established in which fuel supply to the engine 10 is stopped and the forward clutch 3a between the engine 10 and the driving wheel 50 is disengaged, when the accelerator pedal 41 is depressed during traveling in the sailing-stop state, the engine 10 is started and the forward clutch 3a is engaged to increase the hydraulic pressure supplied to the pulleys 4a and 4b, and a timing at which the hydraulic pressure supplied to the pulleys 4a and 4b becomes higher due to the accelerator pedal 41 being depressed during traveling in the sailing-stop state is later than a timing at which the hydraulic pressure supplied to the pulleys 4a and 4b becomes higher due to the accelerator pedal 41 being further depressed when the vehicle is not in the sailing-stop state, or in a case where the accelerator pedal 41 is in a non-depressed state during traveling, a coasting state (second traveling state) is established in which the fuel supply to the engine 10 is stopped and the engine 10 is rotated by a driving force transmitted from the driving wheel 50 to the engine 10, when the accelerator pedal 41 is depressed during traveling in the coasting state, the fuel supply to the engine 10 is restarted, and the hydraulic pressure supplied to the pulleys 4a and 4b is increased, in a case where the accelerator pedal 41 is in a non-depressed state during traveling and a prescribed condition is satisfied, a sailing-stop state (first traveling state) is established in which the fuel supply to the engine 10 is stopped and the forward clutch 3a between the engine 10 and the driving wheel 50 is disengaged, when the accelerator pedal 41 is depressed during traveling in the sailing-stop state, the engine 10 is started and the forward clutch 3a is engaged to increase the hydraulic pressure supplied to the pulleys 4a and 4b, and a timing at which the hydraulic pressure supplied to the pulleys 4a and 4b increases due to the accelerator pedal 41 being depressed during traveling in the sailing-stop state is later than a timing at which the hydraulic pressure supplied to the pulleys 4a and 4b increases due to the accelerator pedal 41 being further depressed during traveling in the coasting state.

The program for executing the series of processes described above is provided by a computer-readable storage medium. In the controller 30, the program may be stored in the storage unit 33.

In addition, various programs to be executed by the computer may be stored in a non-transitory recording medium such as a CD-ROM.

The present application claims a priority of Japanese Patent Application No. 2022-027787 filed with the Japan Patent Office on Feb. 25, 2022, all the contents of which are hereby incorporated by reference.

DESCRIPTION OF REFERENCE SIGNS 100 vehicle
3a forward clutch (clutch)
4 variator (continuously variable transmission mechanism)
4a primary pulley (pulley)
4b secondary pulley (pulley)
4c belt (endless member)
10 engine
20 automatic transmission (transmission)
30 controller (vehicle control device, computer)
41 accelerator pedal (accelerator)
50 driving wheel

The invention claimed is:

1. A vehicle control device for controlling a vehicle that transmits a driving force received from an engine to a driving wheel via a continuously variable transmission mechanism including a pair of pulleys and an endless member wound around the pulleys, and increases a hydraulic pressure supplied to the pulleys in a case where an accelerator is further depressed, wherein
in a case where the accelerator is in a non-depressed state during traveling, a first traveling state is established in which fuel supply to the engine is stopped and a clutch between the engine and the driving wheel is disengaged,
when the accelerator is depressed during traveling in the first traveling state, the engine is started and the clutch is engaged to increase the hydraulic pressure supplied to the pulleys, and
a timing at which the hydraulic pressure supplied to the pulleys becomes higher due to the accelerator being depressed during traveling in the first traveling state is later than a timing at which the hydraulic pressure supplied to the pulleys becomes higher due to the accelerator being further depressed when the vehicle is not in the first traveling state.

2. The vehicle control device according to claim 1, wherein
when the accelerator is depressed during traveling in the first traveling state, the clutch is engaged after performing a downshift for increasing a speed ratio.

3. The vehicle control device according to claim 1, wherein
the timing at which the hydraulic pressure supplied to the pulleys becomes higher due to the accelerator being depressed during traveling in the first traveling state is after a prescribed time elapses from start of supply of an oil for engaging the clutch.

4. The vehicle control device according to claim 3, wherein
the timing at which the hydraulic pressure supplied to the pulleys becomes higher due to the accelerator being depressed during traveling in the first traveling state is after pre-charge of filling a hydraulic chamber with the oil for engaging the clutch.

5. A vehicle control device for controlling a vehicle that transmits a driving force received from an engine to a driving wheel via a continuously variable transmission mechanism including a pair of pulleys and an endless member wound around the pulleys, wherein
in a case where an accelerator is in a non-depressed state during traveling, a second traveling state is established in which fuel supply to the engine is stopped and the engine is rotated by a driving force transmitted from the driving wheel to the engine,
when the accelerator is depressed during traveling in the second traveling state, the fuel supply to the engine is restarted, and a hydraulic pressure supplied to the pulleys is increased,
in a case where the accelerator is in a non-depressed state during traveling and a prescribed condition is satisfied, a first traveling state is established in which the fuel supply to the engine is stopped and a clutch between the engine and the driving wheel is disengaged,
when the accelerator is depressed during traveling in the first traveling state, the engine is started and the clutch is engaged to increase the hydraulic pressure supplied to the pulleys, and
a timing at which the hydraulic pressure supplied to the pulleys becomes higher due to the accelerator being depressed during traveling in the first traveling state is later than a timing at which the hydraulic pressure supplied to the pulleys becomes higher due to the accelerator being further depressed during traveling in the second traveling state.

6. A vehicle control method for controlling a vehicle that transmits a driving force received from an engine to a driving wheel via a continuously variable transmission mechanism including a pair of pulleys and an endless member wound around the pulleys, and increases a hydraulic pressure supplied to the pulleys in a case where an accelerator is further depressed, wherein
in a case where the accelerator is in a non-depressed state during traveling, a first traveling state is established in which fuel supply to the engine is stopped and a clutch between the engine and the driving wheel is disengaged, when the accelerator is depressed during traveling in the first traveling state, the engine is started and the clutch is engaged to increase the hydraulic pressure supplied to the pulleys, and a timing at which the hydraulic pressure supplied to the pulleys becomes higher due to the accelerator being depressed during traveling in the first traveling state is later than a timing at which the hydraulic pressure supplied to the pulleys becomes higher due to the accelerator being further depressed when the vehicle is not in the first traveling state.

7. A vehicle control method for controlling a vehicle that transmits a driving force received from an engine to a driving wheel via a continuously variable transmission mechanism including a pair of pulleys and an endless member wound around the pulleys, wherein in a case where an accelerator is in a non-depressed state during traveling, a second traveling state is established in which fuel supply to the engine is stopped and the engine is rotated by a driving force transmitted from the driving wheel to the engine, when the accelerator is depressed during traveling in the second traveling state, the fuel supply to the engine is restarted, and a hydraulic pressure supplied to the pulleys is increased, in a case where the accelerator is in a non-depressed state during traveling and a prescribed condition is satisfied, a first traveling state is established in which the fuel supply to the engine is stopped and a clutch between the engine and the driving wheel is disengaged, when the accelerator is depressed during traveling in the first traveling state, the engine is started and the clutch is engaged to increase the hydraulic pressure supplied to the pulleys, and a timing at which the hydraulic pressure supplied to the pulleys becomes higher due to the accelerator being depressed during traveling in the first traveling state is later than a timing at which the hydraulic pressure supplied to the pulleys becomes higher due to the accelerator being further depressed during traveling in the second traveling state.

* * * * *